United States Patent [19]
Alonso et al.

[11] Patent Number: 6,032,262
[45] Date of Patent: Feb. 29, 2000

[54] DISK DRIVE RELIABILITY DETERMINATION SYSTEM AND METHOD

[75] Inventors: Ramón L. Alonso, Cambridge; Cline W. Frasier, Concord, both of Mass.

[73] Assignee: EMC Corporation, Hopkinton, Mass.

[21] Appl. No.: 08/423,881

[22] Filed: Apr. 18, 1995

[51] Int. Cl.⁷ .................................................. G06F 11/00
[52] U.S. Cl. .................................................. 714/1; 360/39
[58] Field of Search .................................. 395/180; 714/1; 360/31, 39, 45, 75, 103–105; 324/454; 73/12.09, 866.4

[56] References Cited

U.S. PATENT DOCUMENTS

| | | | |
|---|---|---|---|
| 3,909,800 | 9/1975 | Recks et al. | 710/5 |
| 4,398,225 | 8/1983 | Cornaby et al. | 360/39 |
| 4,416,144 | 11/1983 | Chen | 73/12 |
| 4,532,802 | 8/1985 | Yeack-Scranton | 73/432 R |
| 4,612,586 | 9/1986 | Sordello | 360/31 |
| 4,724,392 | 2/1988 | Bandara | 324/454 |
| 4,795,981 | 1/1989 | Ertingshausen | 324/454 |
| 4,796,109 | 1/1989 | Sordello | 360/45 |
| 4,872,071 | 10/1989 | Easton | 360/31 |
| 5,038,625 | 8/1991 | Chen | 73/865.9 |
| 5,121,263 | 6/1992 | Kerwin | 360/53 |
| 5,384,675 | 1/1995 | Crawforth | 360/75 |

*Primary Examiner*—Dieu-Minh T. Le
*Attorney, Agent, or Firm*—Richard A. Jordan; John M. Gunther

[57] ABSTRACT

A system and method are provided for generating a reliability assessment of a disk drive. The disk drive includes at least one rotatable disk having a surface, and a slider positioned proximate said surface, the slider having a contour that cooperates with air entrained with the disk surface while the disk is rotating when the disk drive is in an operational condition to provide a lift force to enable the slider to fly over the disk surface, the slider parking on the disk surface while the disk is not rotating when the disk drive is in a shut-down condition, the slider sliding over the disk surface while the disk is in a transitional condition sequencing between the shut-down condition and the operational condition. A predetermined bit pattern is written in the parking region of the disk surface, and a reliability assessment is generated based on the amplitude of a signal generated during reading of the predetermined bit pattern in the parking region while the disk drive is in the transitional condition.

14 Claims, 3 Drawing Sheets

---

110. ENABLE THE RECORDING HEAD TO WRITE A PREDETERMINED PATTERN OF DATA BITS IN THE PARKING REGION OF THE DISK

111. DURING START-UP, ENABLE THE DISK DRIVE TO ENABLE THE RECORDING HEAD TO READ THE PREVIOUSLY-WRITTEN DATA BIT PATTERN AND PROVIDE AN ANALOG ELECTRICAL SIGNAL IN RESPONSE

112. USE THE SIGNAL AMPLITUDE INFORMATION PROVIDED BY THE RECORDING HEAD TO GENERATE AN ASSESSMENT AS TO THE LIKELIHOOD THAT THE DISK DRIVE WILL FAIL

110. ENABLE THE RECORDING HEAD TO WRITE A PREDETERMINED PATTERN OF DATA BITS IN THE PARKING REGION OF THE DISK

↓

111. DURING START-UP, ENABLE THE DISK DRIVE TO ENABLE THE RECORDING HEAD TO READ THE PREVIOUSLY-WRITTEN DATA BIT PATTERN AND PROVIDE AN ANALOG ELECTRICAL SIGNAL IN RESPONSE

↓

112. USE THE SIGNAL AMPLITUDE INFORMATION PROVIDED BY THE RECORDING HEAD TO GENERATE AN ASSESSMENT AS TO THE LIKELIHOOD THAT THE DISK DRIVE WILL FAIL

*FIG. 2*

DISK DRIVE RELIABILITY DETERMINATION SYSTEM AND METHOD

FIELD OF THE INVENTION

The invention relates generally to the field of mass data storage subsystems for use in connection with digital computers and the like, and more particularly to systems and methods for generating a reliability assessment predicting the reliability of drives used in such subsystems.

BACKGROUND OF THE INVENTION

Modern mass digital data storage subsystems are used for storing data for use, for example, for processing by digital computer systems or the like. Typically such subsystems include one or more planar rotating disks onto which data, in the form of binary digits (bits) are written or from which data is read by means of one or more recording heads positioned proximate each disk surface. Each disk is formed from a substrate onto which a magnetic material has been deposited. During a writing operation, an electrical signal representative of the digital data bits to be written is applied to the recording head. The electrical signal enables the head to generate an alternating magnetic field that, in turn, forms patterns of magnetic domains of alternating polarity head in the magnetic material that passes under the head as the disk rotates. On the other hand, during a reading operation, the recording head is positioned proximate the areas of the disk on which the data bits were previously written. The recording head senses the variations in the magnetic field in the magnetic domains and generates an electrical signal in response, that is processed to recover and identify the data bits.

In modern disk drives, each recording head is mounted in a "slider," which is held by an arm. A spring force applied to the arm biases the slider toward the disk surface. A slider has a shape generally similar to an air foil, which cooperates with air entrained with the rotating disk, termed an "air bearing," to generate a lift force that overcomes the spring bias allowing the slider to essentially fly over the disk surface. The arm holding the slider is pivotable to position the slider at diverse radial positions over the disk surface, each radial position comprising a track in which the recording head can write data to or read data from. While the disk rotation is stopped, the slider typically rests on the disk surface in a region termed the "parking region." As the disk rotation accelerates during a start-up operation the slider will slide over the disk surface until the entrained air reaches a speed that provides sufficient lift to force to overcome the spring force biasing the slider toward the surface, and thereby enable the slider to lift off the disk surface. Similarly, as the disk rotation decelerates during a shut-down operation, the entrained air may slow sufficiently while the disk is still rotating that the slider will land and slide over the disk surface until the disk comes to a complete stop.

The reliability of mass storage subsystems, particularly of the disk drives therein, is of considerable importance in digital data processing systems and other systems in which they are incorporated. Failure of a disk drive can result in loss or corruption of data, which can have evident negative consequences. Disk drives can fail for a number of reasons, including failures in the disk drive mechanism preventing the disks from rotating properly. In addition, "head crashes" can occur in which a slider dives into a disk surface or contamination such as dust on the disk surface. Head crashes can damage the slider and recording head, and can also damage the magnetic material on a disk surface so that the previously-stored data would be lost. Other failure modes occur which are related to wear on the slider resulting from sliding over the disk surface prior to the lift-off during a start-up operation and after landing during a shut-down operation; excessive wear, due to failure of a slider to lift off in a timely basis during a start-up operation, or due to the slider landing too early during a shut-down operation, may cause generation of excessive thermal energy in the slider and recording head, which can cause undesirable wear and corrosion and early failure of the recording head.

Because failure of disk drives can have a deleterious effect on the operation of, for example, computer systems in which they are used and, in particular, the availability of data stored therein, it is desirable to be able to identify those drives which are likely to fail, at least before they are sold to customers and placed in service. In one test arrangement, the pattern of acoustic energy (that is, sound) that is generated by a disk drive during start-up or shut-down can give a clue as to whether the sliders in the drive are operating properly. In that arrangement, the amplitude of the acoustic energy that is generated by a particular slider will increase as the disk rotation accelerates until the slider lifts off the disk surface. When the slider lifts off, the acoustic energy will decrease rapidly. If the pattern of the amplitude of acoustic energy generated by a slider shows that the slider is, for example, unusually slow in lifting off, it may be determined that there is an increased likelihood that the slider is likely to fail and, accordingly, the slider may be replaced before the drive is placed into service. However, since the test arrangement will detect patterns of acoustic energy as generated by the entire disk drive, which will include acoustic energy contributions from all of the sliders, it may be difficult to identify which of the sliders in the disk drive should be replaced. Accordingly, while the acoustic test arrangement may be helpful in determining that one or more of the sliders should be replaced, it may not be sufficient to identify the particular sliders that should be replaced.

SUMMARY OF THE INVENTION

The invention provides a new and improved system and method for generating a reliability assessment that identifying the likelihood of a failure of a disk drive used, for example, in a mass digital data storage subsystem.

In brief summary, the invention provides a disk drive reliability assessment generating system for generating a reliability assessment of a disk drive for use in a mass data storage subsystem. The disk drive includes at least one rotatable disk having a surface, and a slider positioned proximate said surface, the slider having a contour that cooperates with air entrained with the disk surface while the disk is rotating when the disk drive is in an operational condition to provide a lift force to enable the slider to fly over the disk surface, the slider parking on the disk surface while the disk is not rotating when the disk drive is in a shut-down condition, the slider sliding over the disk surface while the disk is in a transitional condition sequencing between the shut-down condition and the operational condition. The system comprises means for writing a predetermined bit pattern in the parking region of the disk surface and a processor. The processor enables the disk drive to sequence between the shut-down condition and the operational condition and provide an amplitude value representative of a signal generated during reading of the predetermined bit pattern in the parking region while the disk drive is in the transitional condition, and generates a reliability assessment in response to the amplitude value.

In another aspect, the invention provides a method of generating a reliability assessment of a disk drive for use in a mass data storage subsystem. The disk drive includes at least one rotatable disk having a surface, and a slider positioned proximate said surface, the slider having a contour that cooperates with air entrained with the disk surface while the disk is rotating when the disk drive is in an operational condition to provide a lift force to enable the slider to fly over the disk surface, the slider parking on the disk surface while the disk is not rotating when the disk drive is in a shut-down condition, the slider sliding over the disk surface while the disk is in a transitional condition sequencing between the shut-down condition and the operational condition. In accordance with the method, a predetermined bit pattern is written in the parking region of the disk surface. The disk drive is controlled to sequence between the shut-down condition and the operational condition and enabling the disk drive to provide an amplitude value representative of a signal generated during reading of the predetermined bit pattern in the parking region while the disk drive is in the transitional condition. Finally, a reliability assessment is generated in response to the amplitude value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a flow diagram describing the operations performed by the system depicted in FIG. 1 in accordance with the invention.

DETAILED DESCRIPTION OF AN ILLUSTRATIVE EMBODIMENT

Figure 1:
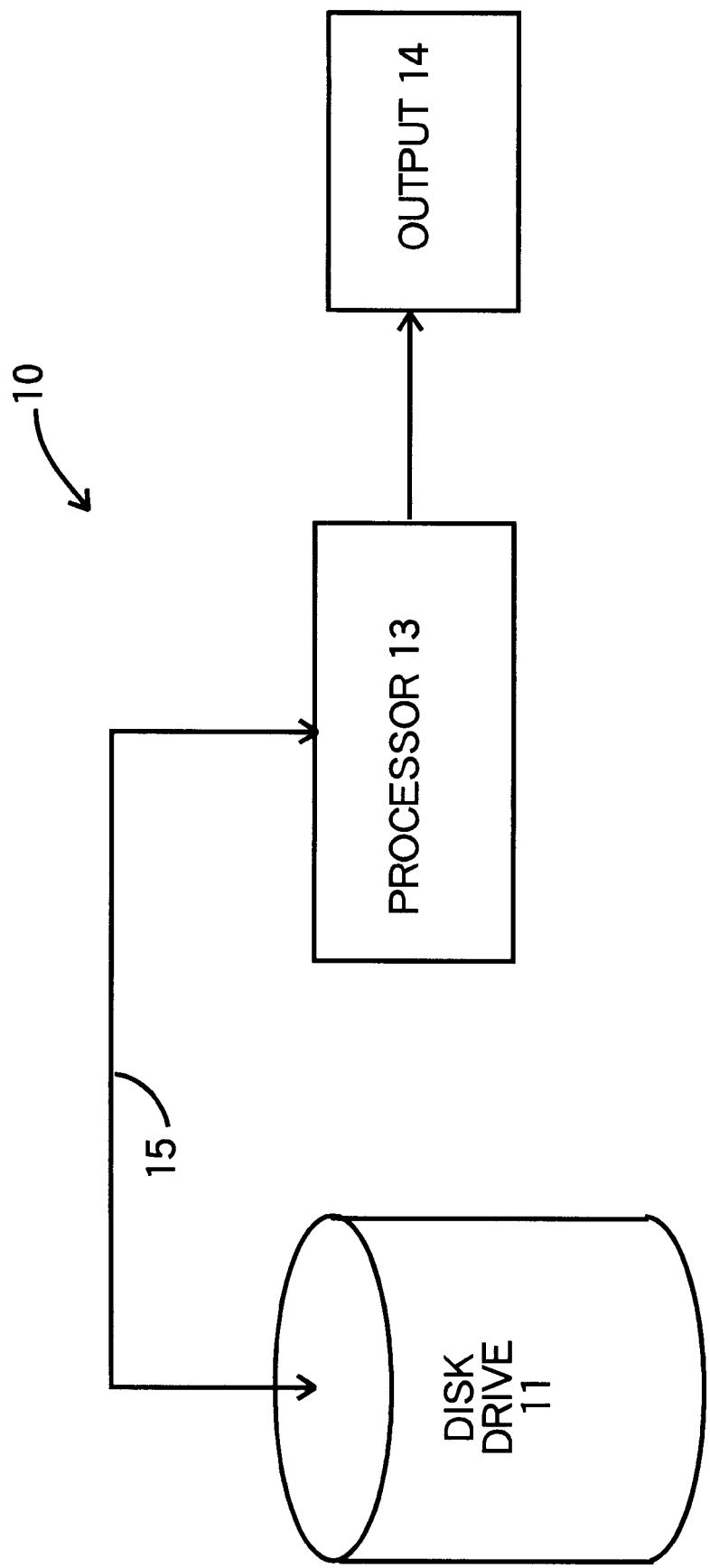
FIG. 1 is a functional block diagram of a disk reliability assessment system constructed in accordance with the invention.

FIG. 1 is a functional block diagram of a disk reliability assessment system 10 constructed in accordance with the invention. The system 10 generally includes a disk drive 11 whose reliability is to be assessed, a processor 13 and an output device 14. As is conventional, the disk drive 11 includes one or more disks (not shown) whose surfaces are formed from magnetic material. The disks are axially mounted on a spindle (a common spindle in the case of a disk drive which includes multiple disks), which is rotated by a motor thereby enabling the disk or disks to rotate about their axes. Recording heads (not shown), mounted in sliders, are held by respective arms in close proximity to respective disk surfaces to write digital data, in the form of magnetic domains of alternating polarities, onto and read the previously-written data from, the disks' respective magnetic surfaces.

The processor 13 generates commands for controlling the disk drive 11, which it transmits over a bus 15. The commands may enable the disk drive 11 to start and stop disk rotation, write data onto or read data from the disk, and in addition perform a number of other conventional operations, such as enabling the disk drive's arm or arms (not shown) to move their respective sliders and accompanying recording head(s) (also not shown) to a selected track in preparation for enabling a read or write operation, to enable the arm or arms to move to a parking track as part of a disk rotation stop operation or the like. The parking track is provided as a region of the disk that is normally not used to store data. The processor 13 may also transmit data to be stored on the disk drive 11 and receive previously-stored data from the disk drive 11 over bus 15, and provide status or other information to output 14 for display to an operator.

As described above, each recording head is mounted in a slider. Each slider has a contour similar to that of an airfoil, enabling it to ride on an air bearing, formed proximate its respective disk surface by air entrained with the rotation of the disk, with the height of the slider above the disk being determined by speed of the entrained air and an opposing spring-bias provided by the arm. It will be appreciated that, since the arm provides the spring bias continuously, when the disk rotation stopped, the spring bias will force the slider into contact with the disk surface; essentially it "lands" on the disk surface. As rotation is started, the air entrained with the disk forms the air bearing. At some point while the disk is being accelerated during a start-up operation, the speed of the air forming the air bearing will increase to a point at which the lift force provided by the airfoil contour overcomes the spring bias provided by the arm, and at that point the slider will lift off the disk surface. The slider will reach a maximum displacement when the disk reaches its maximum rotational speed, at which time the entrained air forming the air bearing will have its maximum air speed. Contrariwise, as the rotation of the disk slows as, for example, part of a shut down operation, the air speed of the air bearing will be reduced, and the slider will descend toward the disk surface. At some point, the air speed will be insufficient to enable the lift force generated by the airfoil to overcome the spring bias provided by the arm, and at that point the slider will land on the disk surface.

It will be appreciated that, since the air speed of the air bearing must be sufficient to enable the airfoil contour of the slider to develop sufficient lift force to allow the slider to lift off the disk surface, during a start-up operation, the slider will slide over the disk surface for at least some period of time, that is until the entrained air forming the air bearing reaches the speed required to provide sufficient lift force to lift the slider off the disk surface. The slider may also slide over the disk surface during a shut-down operation, although, depending on the disk, the air speed of the air entrained with the disk may not slow as rapidly as the disk, and so the air bearing may exist long enough at sufficient air speed to provide enough lift so that the slider will not land until the disk has stopped rotating. In current disk drives, the disks are often provided with a thin lubricant film over their magnetic surfaces to reduce frictional forces that normally develop during lift-off and landing of a slider from and onto a disk surface. Nonetheless, it will be appreciated that the frictional forces can result in generation of thermal energy, excessive amounts of which can lead to damage of the slider and recording head. In cases in which, for example, sliders that are improperly formed, which may occur due to conventional manufacturing variations, or in which sliders are improperly mounted on the arms, so that they tilt on lift-off or do not have the required orientation relative to the entrained air, the sliders may not lift off or land properly, which can also lead to generation of excessive amounts of thermal energy, which increases the likelihood of drives incorporating such sliders to have reliability problems and potentially of failing. In accordance with the invention, the system 10 provides an arrangement for generating a reliability assessment in connection with a drive, thereby to identify disk drives in which this is likely to occur, and in particular the specific sliders and recording heads in the drives for which this is likely to occur. Identification of sliders and heads that are likely to fail during test of the assembled drives immediately following manufacturing may facilitate replacement with correctly functioning ones, thereby reducing the likelihood of failure after the drives have been placed in service.

It will be appreciated that, in the test arrangement as described above, in which acoustic energy generated by a disk drive during a start-up operation or a shut-down operation is used to assess the likelihood of failure of the disk drive, the likelihood of failure is determined for the disk drive as a whole, and will not identify the particular slider or sliders which are most likely to fail. In accordance with the invention, the system 10 can determine the likelihood of failure on a per-head or per-slider basis. This will be described for a start-up operation in connection with FIGS. 2 and 3, and the extension to use in a shut-down operation will be readily apparent to those skilled in the art.

With reference to FIG. 2, the processor 13 will initially enable the disk drive 11 to, in turn, enable the recording head to write a predetermined pattern of data bits, defined by a predetermined pattern of alternating magnetic domains, in the region of the disk in which the slider parks when the disk is not rotating (step 110). The particular bit pattern selected as the predetermined pattern is not particularly important, although it will be clear that the bit pattern should be selected to ensure that any electrical signal generated in response thereto will have a non-zero amplitude. Thereafter, during start-up, for example, the processor 13 enables the disk drive to, in turn, enable the recording head to read the previously-written data bit pattern (step 111). In the reading operation, instead of actually reading the binary content of the bits for transfer to the processor, the processor 13 enables the disk drive to provide information as to the instantaneous amplitude of the electrical signal generated by the recording head in response to the parking region pattern.

Figure 3:
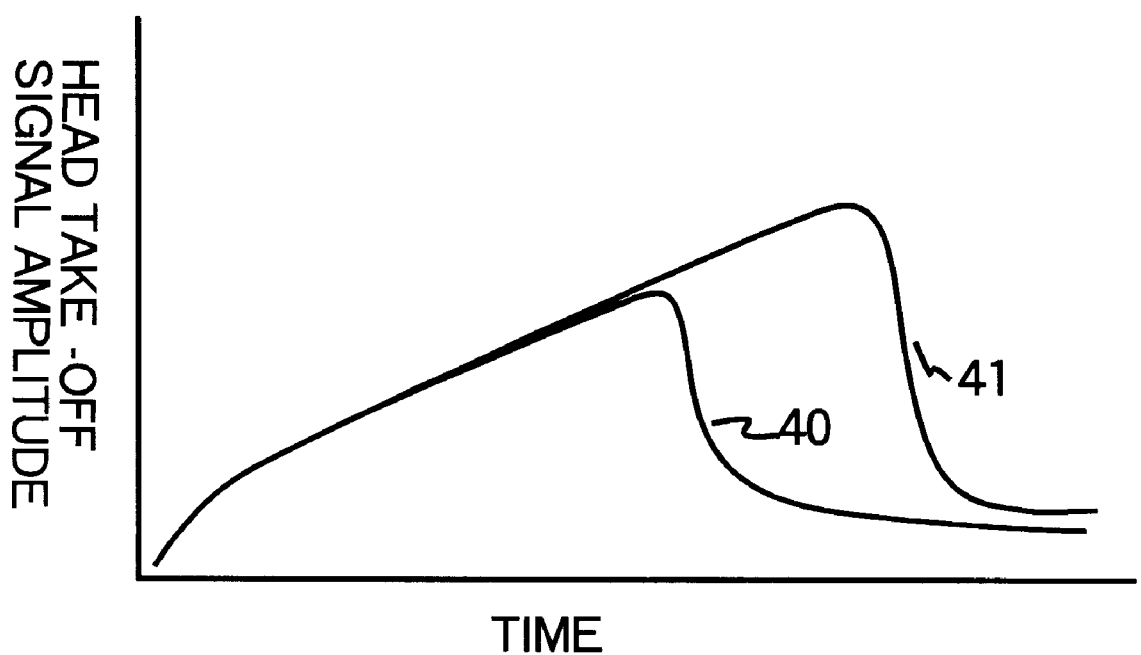
FIG. 3 is a diagram useful in understanding the operations described in the flow diagram in FIG. 2.

While the recording head is in contact with the disk surface, the electrical signal will have a relatively large amplitude, which increases with increasing disk rotational speed, since the magnetic fields defining the parking region pattern are in relatively close proximity to the recording head. On the other hand, when the recording head is lifted away from the disk surface by the slider, the magnetic fields will be relatively distant, and so the signal amplitude will drop off quickly. This is shown in the graph in FIG. 3. FIG. 3 depicts two curves 40 and 41 of generally similar shape, except that curve 41 is larger than curve 40 and has a peak that extends further to the right. Both curves 40 and 41 represent the amplitude of a signal generated by a recording head of a disk drive in response to a parking region magnetic pattern as a function of time since the beginning of rotation for disk drive 11 during a start-up operation.

Since the peak of curve 40 is depicted as being at an earlier time than the peak of curve 41, and since the peak, and thus the point at which the amplitude of the associated signal begins to diminish, indicates the point in time at which the slider lifts off the disk surface, curve 40 represents a signal generated by a recording head associated with a slider which lifts off earlier than that of curve 41. Since the signal amplitude will be directly proportional to the relative speed between the recorded data pattern and recording head, and inversely proportional to the square of the distance between the recording medium and the recording head, the signal amplitude will correspond to $$A(t) = K_v \frac{Vel(t)}{H_0^2}, \quad (1)$$

where Vel(t) represents the relative speed with which the disk's parking region moves under the recording head, $K_v$ is a proportionality constant, $H_0$ is a measure of distance from the disk's recording medium to the recording head, and "t" represents time, for time prior to the lift-off of the slider from the surface of the disk. After the slider lifts off the disk surface, the amplitude will correspond to $$A(t) = K_v \frac{Vel(t)}{\left(H_0 + K_{Lift}\sqrt{Vel(t) - V_k}\right)^2}, \quad (2)$$

where $V_k$ represents the represents the relative speed with which the disk's parking region moves under the recording head at the point when the slider lifts off the disk surface, and $K_{lift}$ is a proportionality constant relating the disk speed to the height of the slider above the disk surface.

As will be appreciated from equation 2, the amplitude of the signal from the recording head will drop off rapidly as the recording head lifts off, as is indicated by the curves in FIG. 3. Since, as described above, likelihood of failure for a recording head is related to the length of time required before the slider lifts off, the processor 13 can determine the likelihood of failure from the length of time for the signal received by the processor 13 in step 111 to reach a peak, in comparison to an ideal time based on the expected flying characteristics for the slider. The expected flying characteristics for the slider, in turn, can be readily determined based on the contours of the slider and aerodynamic principles relating the point during the start-up operation at which the air bearing entrained with the disk would provide sufficient lift force on the slider to overcome the force biasing the slider toward the disk surface. It would be expected that actual lift-off times will deviate from the ideal lift-off times to some extent due to, for example, variations in manufacturing and the like, and so a slider may be deemed to be satisfactory if its lift-off time is within a selected number of statistical standard deviations from the ideal lift-off time, and otherwise likely to fail if its lift-off time is greater than that selected number of statistical standard deviations from the ideal lift-off time.

If the processor 13 determines that a particular slider is likely to fail, it may notify an operator through output 14, and the operator may arrange for remedial measures, such as replacement of the slider and re-testing of the drive with the replacement slider.

While FIGS. 2 and 3 depict operations in connection with a start-up operation, it will be appreciated by those skilled in the art that the system 10 can perform similar operations in connection with a shut-down operation to determine a reliability assessment and likelihood of failure for a slider and accompanying recording head.

In addition, while the disk drive 11 has been described such that the recording head takes off from a parking region during start-up, and lands on the parking region during shut-down, it will be appreciated that, for drives in which there is no parking region (that is, for drives in which the recording head takes off from and lands on portions of the recording medium in which data is normally stored), the predetermined pattern can be written in any region that stores data and the operations described above be performed in connection with those regions instead of the parking region.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A disk drive reliability assessment generating system for generating a reliability assessment of a disk drive, the disk drive including at least one rotatable disk having a surface, a predetermined region of said surface having a predetermined bit pattern recorded thereon, and a slider positionable proximate said surface, the slider having a contour that cooperates with air entrained with the disk surface while the disk is rotating when the disk drive is in an operational condition to provide a lift force to enable the slider to fly over the disk surface, the slider parking on the disk surface while the disk is not rotating when the disk drive is in a shut-down condition, the slider sliding over the disk surface while the disk is in a transitional condition sequencing between the shut-down condition and the operational condition, the slider carrying a head for recording information on said surface and reading information stored on said surface, the system comprising:

A. a disk drive control element adapted to control the disk drive to sequence between the shut-down condition and the operational condition;

B. a head control element adapted to enable the disk drive to read the predetermined bit pattern and provide an amplitude value representative of a signal generated by said head during reading of the predetermined bit pattern at least while the disk drive is in the transitional condition; and C. a reliability assessment generator for generating the reliability assessment in response to the amplitude value.

2. A disk drive reliability assessment generating system as defined in claim 1 further comprising a bit pattern recording control element adapted to control the recording of the predetermined bit pattern on said surface.

3. A disk drive reliability assessment generating system as defined in claim 2 in which the bit pattern recording control element enables the head to record the predetermined bit pattern on said surface.

4. A disk drive reliability assessment generating system as defined in claim 2 in which the predetermined bit pattern is recorded in a parking region of said surface on which the slider rests while the disk drive is in the shut-down condition.

5. A disk drive reliability assessment generating system as defined in claim 1 in which, while the slider is sliding over said surface, the amplitude value has an amplitude A(t) as a function of time "t" corresponding to $$A(t) = K_v \frac{Vel(t)}{H_0^2}$$

where Vel(t) represents a relative speed with which the disk's surface region moves under the recording head, $K_v$ is a proportionality constant, $H_0$ is a measure of distance from the disk surface to the recording head.

6. A disk drive reliability assessment generating system as defined in claim 1 in which, after the slider has lifted off said surface, the amplitude value has an amplitude A(t) as a function of time "t" corresponding to $$A(t) = K_v \frac{Vel(t)}{\left(H_0 + K_{Lift}\sqrt{Vel(t) - V_k}\right)^2}, \quad (2)$$

where Vel(t) represents a relative speed with which the disk's surface region moves under the recording head, $H_0$ is a measure of distance from the disk surface to the recording head, $V_k$ represents the represents the relative speed with which the said surface moves under the recording head at the point when the slider lifts off the disk surface, and $K_{lift}$ is a proportionality constant relating the disk speed to the height of the slider above the disk surface.

7. A disk drive reliability assessment generating system as recited in claim 1 in which amplitude value has a maximum value when the slider lifts off the disk surface, and in which the reliability assessment generator generating the reliability assessment in response to the time between when the disk begins rotating and when the amplitude value has its maximum value.

8. A method of generating a reliability assessment of a disk drive, the disk drive including at least one rotatable disk having a surface, a predetermined region of said surface having a predetermined bit pattern recorded thereon, and a slider positioned proximate said surface, the slider having a contour that cooperates with air entrained with the disk surface while the disk is rotating when the disk drive is in an operational condition to provide a lift force to enable the slider to fly over the disk surface, the slider parking on the disk surface while the disk is not rotating when the disk drive is in a shut-down condition, the slider sliding over the disk surface while the disk is in a transitional condition sequencing between the shut-down condition and the operational condition, the slider carrying a head for recording information on said surface and reading information stored on said surface, the method comprising the steps of:

A. controlling the disk drive to sequence between the shut-down condition and the operational condition;

B. enabling the disk drive to provide an amplitude value representative of a signal generated during reading of the predetermined bit pattern while the disk drive is in the transitional condition; and B. generating a reliability assessment in response to the amplitude value.

9. A method as defined in claim 8 further comprising the step of recording the predetermined bit pattern on said surface.

10. A method as defined in claim 9 in which head records the predetermined bit pattern on said surface.

11. A method as defined in claim 9 in which the predetermined bit pattern is recorded in a parking region of said surface on which the slider rests while the disk drive is in the shut-down condition.

12. A disk method as defined in claim 9 in which, while the slider is sliding over said surface, the amplitude value has an amplitude A(t) as a function of time "t" corresponding to $$A(t) = K_v \frac{Vel(t)}{H_0^2}$$

where Vel(t) represents a relative speed with which the disk's surface region moves under the recording head, $K_v$ is a proportionality constant, $H_0$ is a measure of distance from the disk surface to the recording head.

13. A method as defined in claim 9 in which, after the slider has lifted off said surface, the amplitude value has an amplitude A(t) as a function of time "t" corresponding to $$A(t) = K_v \frac{Vel(t)}{\left(H_0 + K_{Lift}\sqrt{Vel(t) - V_k}\right)^2}, \quad (4)$$

where Vel(t) represents a relative speed with which the disk's surface region moves under the recording head, $H_0$ is a measure of distance from the disk surface to the recording head, $V_k$ represents the represents the relative speed with which the said surface moves under the recording head at the point when the slider lifts off the disk surface, and $K_{lift}$ is a proportionality constant relating the disk speed to the height of the slider above the disk surface.

14. A method as recited in claim 13 in which amplitude value has a maximum value when the slider lifts off the disk surface, and the reliability assessment being generated in response to the time between when the disk begins rotating and when the amplitude value has its maximum value.

* * * * *